US012573174B2

(12) United States Patent
Koshisaka

(10) Patent No.: US 12,573,174 B2
(45) Date of Patent: Mar. 10, 2026

(54) IMAGE PROCESSING APPARATUS

(71) Applicant: DENSO CORPORATION, Kariya-city (JP)

(72) Inventor: Yuzuru Koshisaka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 365 days.

(21) Appl. No.: 18/296,003

(22) Filed: Apr. 5, 2023

(65) Prior Publication Data

US 2023/0326177 A1 Oct. 12, 2023

(30) Foreign Application Priority Data

Apr. 7, 2022 (JP) ................................. 2022-064018

(51) Int. Cl.
*G06V 10/60* (2022.01)
*G06T 5/40* (2006.01)
*H04N 23/73* (2023.01)

(52) U.S. Cl.
CPC ................ *G06V 10/60* (2022.01); *G06T 5/40* (2013.01); *H04N 23/73* (2023.01); *G06T 2207/10144* (2013.01)

(58) Field of Classification Search
CPC . G06V 10/60; G06T 5/40; G06T 2207/10144; G06T 5/90; H04N 23/70; H04N 23/71
USPC ........................................................ 382/274
See application file for complete search history.

(56) References Cited

U.S. PATENT DOCUMENTS

| | | | | |
|---|---|---|---|---|
| 6,061,091 | A | * 5/2000 | Van de Poel et al. . | H04N 5/217 348/241 |
| 6,373,533 | B1 | * 4/2002 | Kawabata et al. ....... | H04N 5/14 348/672 |
| 7,188,014 | B1 | 3/2007 | Liao et al. | |
| 8,009,907 | B1 | * 8/2011 | Srinivassan et al. ......... | 382/168 |
| 2007/0070214 | A1 | 3/2007 | Nakamura | |
| 2008/0211931 | A1 | 9/2008 | Fujisawa et al. | |
| 2009/0110274 | A1 | * 4/2009 | Atanassov et al. ........... | 382/169 |

(Continued)

FOREIGN PATENT DOCUMENTS

| | | |
|---|---|---|
| JP | 2002-152718 A | 5/2002 |
| JP | 2006-135744 A | 5/2006 |

(Continued)

*Primary Examiner* — Matthew C Bella
*Assistant Examiner* — Daniel Joseph Santos
(74) *Attorney, Agent, or Firm* — Maschoff Brennan

(57) ABSTRACT

A histogram generator generates a histogram based on luminance values of respective pixels of an image. The histogram represents a relationship between each of the luminance values of the image listed in a predetermined axis and the number of pixels for the corresponding one of the luminance values. An image corrector calculates, based on the histogram, a luminance increment caused by the light reflected from the cover member, and translates, based on the luminance increment, the histogram in a negative side of the predetermined axis of the histogram to accordingly generate a corrected histogram. The corrected histogram has (i) an estimated least luminance value lower than the least luminance value, and (ii) an estimated most luminance value lower than the most luminance value. The image corrector generates, based on the corrected histogram and the image, a corrected image.

6 Claims, 4 Drawing Sheets

(56)     References Cited

U.S. PATENT DOCUMENTS

| | | | |
|---|---|---|---|
| 2009/0153664 A1 | 6/2009 | Higuchi et al. | |
| 2013/0188051 A1* | 7/2013 | Ishigaki et al. | G06K 9/00791 |
| | | | 348/148 |
| 2014/0293055 A1 | 10/2014 | Otsuka | |
| 2016/0140697 A1 | 5/2016 | Sugimoto et al. | |
| 2019/0347773 A1 | 11/2019 | Naruse et al. | |
| 2020/0186716 A1 | 6/2020 | Tanaka et al. | |
| 2022/0201189 A1 | 6/2022 | Kobayashi | |
| 2022/0383614 A1* | 12/2022 | Wu et al. | G06V 10/60 |

FOREIGN PATENT DOCUMENTS

| | | |
|---|---|---|
| JP | 2006-311031 A | 11/2006 |
| JP | 2012-156715 A | 8/2012 |
| JP | 2013-041481 A | 2/2013 |
| JP | 2017-151930 A | 8/2017 |

* cited by examiner

FIG.6

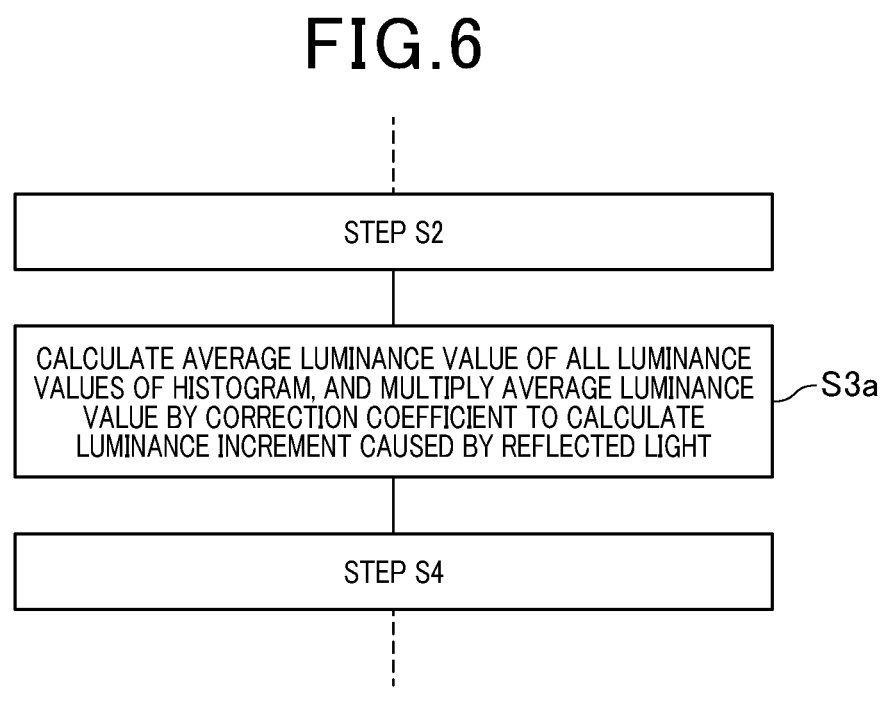

STEP S2

CALCULATE AVERAGE LUMINANCE VALUE OF ALL LUMINANCE VALUES OF HISTOGRAM, AND MULTIPLY AVERAGE LUMINANCE VALUE BY CORRECTION COEFFICIENT TO CALCULATE LUMINANCE INCREMENT CAUSED BY REFLECTED LIGHT ⟋S3a

STEP S4

IMAGE PROCESSING APPARATUS

CROSS REFERENCE TO RELATED APPLICATION

This application is based on and claims the benefit of priority from Japanese Patent Application No. 2022-064018 filed on Apr. 7, 2022, the disclosure of which is incorporated in its entirety herein by reference.

TECHNICAL FIELD

The present disclosure relates to image processing apparatuses installable in a mobile object, such as a vehicle.

BACKGROUND

Mobile objects, such as vehicles, usually use one or more image processing apparatuses for traffic safety improvement. One of these image processing apparatuses is disclosed as an image sensor in Japanese Patent Application Publication No. 2007-183907.

Such an image processing apparatus to be used in a mobile object includes an imaging unit. The imaging unit is configured to receive, during a controllable exposure time, i.e., a controllable shutter time, light focused on a light receiving surface thereof to accordingly capture an image.

Usually, a hood is arranged below the imaging unit for reducing the entrance of light into the imaging unit from below. If such an image processing apparatus is installed in a mobile object, the hood is arranged to reduce the entrance of light into the imaging unit from the inside of the mobile object. Light from below the imaging unit is, for example, reflected light based on sunlight.

SUMMARY

The hood may have a reflectance, and setting the reflectance of the hood to completely zero is difficult. Light reflected by the hood may reach, as flare, a light receiving region of the imaging device, resulting in white blurs and/or flared highlights in a captured image. Such an image including white blurs or flared highlights may be likely to have a lower level of contrast, resulting in the image being difficult to recognize precisely.

For addressing such an issue, an image processing apparatus disclosed in the patent publication performs a correction method of adjusting an amplification factor for a captured image to accordingly reduce the white blurs and/or flared highlights in the captured image.

The imaging unit is configured to successively capture images while controlling the controllable exposure time, i.e., the controllable shutter time, of each image to be captured based on the immediately previous captured image, thus adjusting, for each image to be captured, the quantity of light received by the imaging unit.

Specifically, the exposure time for an image to be captured is limited if a large quantity of light is received by the imaging unit for the immediately previous captured image. A sharp drop of the quantity of reflected light or disappearance of reflected light while the imaging unit is capturing an image based on the limited exposure time may reduce the quantity of light received by the imaging unit, resulting in blocked-up shadows in the captured image.

Additionally, the exposure time for an image to be captured is increased if a small quantity of light is received by the imaging unit for the immediately previous captured image. A sharp increase of the quantity of reflected light or appearance of reflected light while the imaging unit is capturing an image based on the increased exposure time may increase the quantity of light received by the imaging unit, resulting in white blurs and/or flared highlights in the captured image. This is because the level of the amplification factor for the captured image, which is adjusted by the correction method based on the small quantity of light, becomes an insufficient level for efficiently reducing the white blurs and/or flared highlights in the captured image.

In view of the circumstances set forth above, an exemplary aspect of the present disclosure seeks to provide image processing apparatuses, each of which is capable of preventing the occurrence of blocked-up shadows, white blurs, and/or flared highlights in a captured image.

A first exemplary measure of the present disclosure provides an image processing apparatus for an imaging unit that captures, during a controllable exposure time, an image based on incoming light and light reflected from a cover member for covering the imaging unit. The image processing apparatus includes an image obtainer configured to obtain, from the imaging unit, the image captured by the imaging unit. The image is comprised of pixels, each of which has a corresponding one of luminance values. The image processing apparatus includes a histogram generator configured to generate a histogram based on the luminance values of the respective pixels of the image. The histogram represents a relationship between each of the luminance values of the image listed in a predetermined axis and the number of pixels for the corresponding one of the luminance values. The luminance values included in the histogram are within a range from a least luminance value to a most luminance value inclusive. The image processing apparatus includes an image corrector. The image corrector is configured to calculate, based on the histogram, a luminance increment caused by the light reflected from the cover member. The image corrector is configured to translate, based on the luminance increment, the histogram in a negative side of the predetermined axis of the histogram to accordingly generate a corrected histogram. The corrected histogram has (i) an estimated least luminance value that is lower than the least luminance value, and (ii) an estimated most luminance value that is lower than the most luminance value. The image corrector is configured to generate, based on the corrected histogram and the image, a corrected image.

A second exemplary measure of the present disclosure provides a program product for at least one processor for an imaging unit that captures, during a controllable exposure time, an image based on incoming light and light reflected from a cover member for covering the imaging unit. The program product includes a non-transitory processor-readable medium, and a set of program instructions embedded in the processor-readable medium. The instructions cause the at least one processor to obtain, from the imaging unit, the image captured by the imaging unit. The image is comprised of pixels, each of which has a corresponding one of luminance values. The instructions cause the at least one processor to generate a histogram based on the luminance values of the respective pixels of the image. The histogram represents a relationship between each of the luminance values of the image listed in a predetermined axis and the number of pixels for the corresponding one of the luminance values. The luminance values included in the histogram are within a range from a least luminance value to a most luminance value inclusive. The instructions cause the at least one processor to calculate, based on the histogram, a luminance increment caused by the light reflected from the cover member. The instructions cause the at least one processor to translate, based on the luminance increment, the histogram in a negative side of the predetermined axis of the histogram to accordingly generate a corrected histogram. The corrected histogram has (i) an estimated least luminance value that is lower than the least luminance value, and (ii) an estimated most luminance value that is lower than the most luminance value. The instructions cause the at least one processor to generate, based on the corrected histogram and the image, a corrected image.

Each of the image processing apparatus and the processor according to the first and second exemplary measures of the present disclosure calculates, based on the histogram generated in accordance with the luminance values of the respective pixels of the captured image, the luminance increment caused by the light reflected from the cover member. Then, each of the image processing apparatus and the processor translates, based on the luminance increment, the histogram in the negative side of the predetermined axis of the histogram to accordingly generate the corrected histogram. The corrected histogram has (i) the estimated least luminance value that is lower than the least luminance value, and (ii) the estimated most luminance value that is lower than the most luminance value. Each of the image processing apparatus and the processor generates, based on the corrected histogram and the image, a corrected image.

Each of the image processing apparatus and the processor according to the first and second exemplary measures of the present disclosure therefore reduces, from the corrected image, the influence of the light reflected from the cover member, making it possible to prevent the occurrence of white blurs and/or flared highlights in the corrected image, while reducing the likelihood of blocked-up shadows in the corrected image even if the light reflected from the cover member suddenly disappears.

BRIEF DESCRIPTION OF THE DRAWINGS

Other aspects of the present disclosure will become apparent from the following description of embodiments with reference to the accompanying drawings in which:

FIG. 6 is a flowchart schematically illustrating an example of a modified image-processing algorithm carried out by the image processing apparatus illustrated in FIG. 1.

DETAILED DESCRIPTION OF EMBODIMENT

The following describes an exemplary embodiment of the present disclosure with reference to FIGS. 1 to 5. In the exemplary embodiment and its modifications, descriptions of like parts between the exemplary embodiment and its modifications are omitted or simplified to avoid redundant description.

The exemplary embodiment of the present disclosure provides an image processing apparatus that can be preferably installed in a mobile object, such as a vehicle, and constitute an image processing system together with one or more vehicular cameras, an image display recorder, and a cruse assist apparatus, which are installed in the mobile object.

The following describes an example of the configuration that an image processing apparatus according to the exemplary embodiment is installed in a vehicle and constitutes an image processing system.

Figure 1:
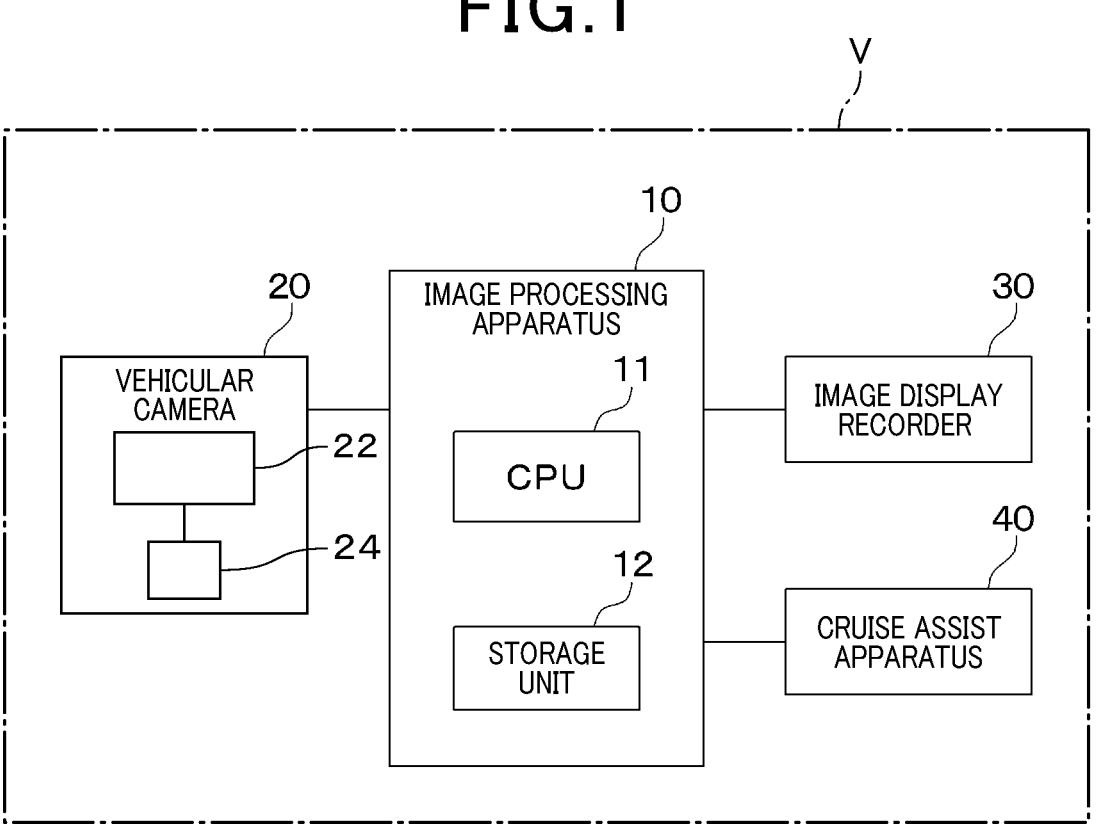
FIG. 1 is a block diagram schematically illustrating an example of the schematic structure of an image processing apparatus according to an exemplary embodiment of the present disclosure.

Specifically, an image processing system 100, which is installed in a vehicle V as an example of a mobile object, includes, as illustrated in FIG. 1, an image processing apparatus 10, a vehicular camera 20, an image display recorder 30, and a cruise assist apparatus 40. The image processing apparatus 10 can be configured to communicate with the above components 20, 30, and 40 via wires and/or radios.

Figure 2:
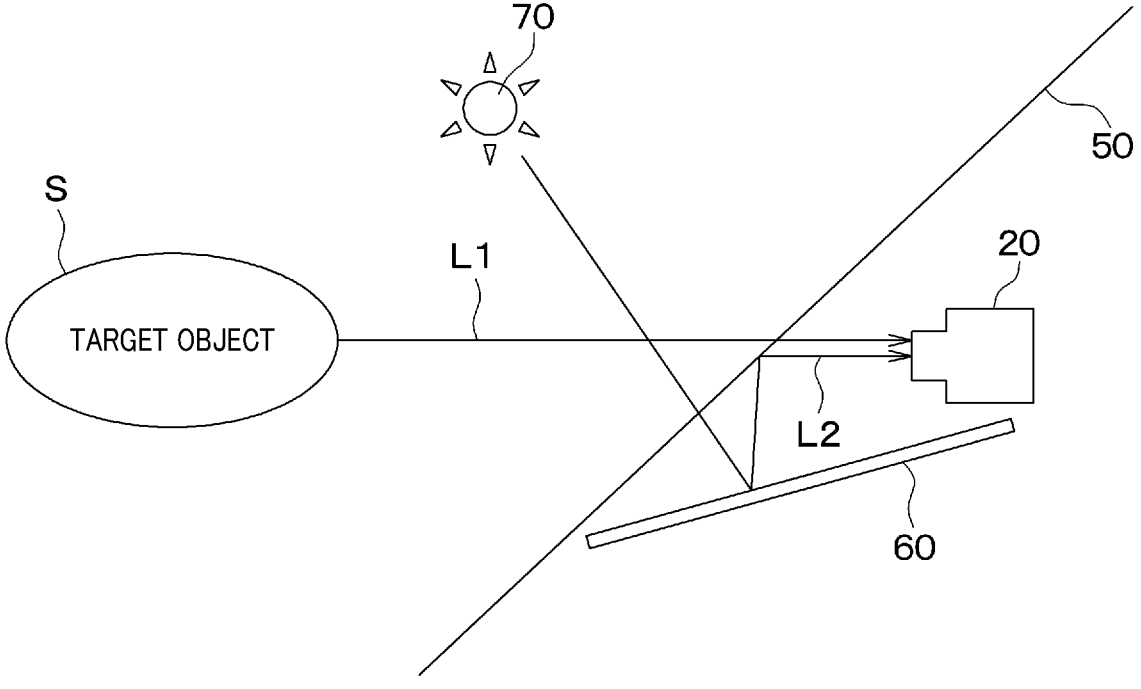
FIG. 2 is a view schematically illustrating an example of an arrangement of a vehicular camera illustrated in FIG. 1.

The vehicular camera 20 is comprised of, for example, a complementary metal-oxide-semiconductor (CMOS) image sensor 22 and a controller 24. The image sensor 22 is comprised of a plurality of light receiving elements, which respectively correspond to a plurality of pixels, two-dimensionally arranged in both vertical and horizontal directions corresponding to the respective height direction and width direction of the vehicle V. The two-dimensionally arranged pixels constitute a two-dimensional light receiving surface of the image sensor 22. The vehicular camera 20 is, as illustrated in FIG. 2, located adjacently to a windshield 50 of the vehicle V such that the light receiving surface faces toward the forward side of the vehicle V.

The vehicular camera 20 is configured such that incoming light focuses onto the light receiving surface of the image sensor 22 as an image of a predetermined field of view in front of the vehicle V.

The image sensor 22 is configured to receive, during an exposure time, i.e., a shutter time, controlled by the controller 24, light focused on the light receiving surface thereof as an image, so that each of the two-dimensionally arranged light-sensitive elements (pixels) receives a corresponding light component. The exposure time during which light is received by the two-dimensionally arranged light-sensitive elements, in other words, during which the two-dimensionally arranged light-sensitive elements are exposed to light, is a control parameter controllable by the controller 24 under control of the image processing apparatus 10.

That is, the vehicular camera 20 is configured to cyclically capture an image, i.e., a frame image, of the field of view at a predetermine frame rate, such as 60 frames per second, in accordance with the exposure time controlled for each frame image to be captured.

Each frame image captured by the image sensor 22 becomes brighter as the exposure time for the corresponding frame image becomes longer, and becomes darker as the exposure time for the corresponding frame image becomes shorter.

The mount position and the location and size of the field of view of the vehicular camera 20 can be freely determined. Similarly, the frame rate of the image sensor 22 of the vehicular camera 20 can be freely determined.

A frame image captured by the vehicular camera 20 based on light entering the light receiving surface of the image sensor 22 is comprised of pixels corresponding to the respective photodiodes. Note that each of the photodiodes of the image sensor 22 will also be referred to as pixel elements of the image sensor 22.

For example, the vehicular camera 20 can be configured to cyclically capture a frame image at the predetermined frame rate in a well-known high-dynamic range (HDR) mode; each pixel of a frame image captured by the vehicular camera 20 has 496 shades ranging from 0 to 495.

More specifically, a frame image captured by the vehicular camera 20 can be a gray-scale frame image, or a color frame image comprised of RGB pixels; each of the RGB pixels is comprised of a red luminance value, a green luminance value, and a blue luminance value.

Alternatively, a color frame image captured by the vehicular camera 20 can include pixels, each of which is comprised of only a red luminance value, a green luminance value, or a blue luminance value.

For example, the vehicular camera 20 can be configured to convert the pixels, i.e., luminance values, of a captured frame image into digital pixels, i.e., digital luminance values, in accordance with a predetermined bit width, i.e., the number of bits, thus obtaining a digital frame image, i.e., digital frame image data, comprised of the digital pixels, i.e., digital luminance values. Then, the vehicular camera 20 can be configured to output, to the image processing apparatus 10, the digital frame image.

As another example, the vehicular camera 20 can be configured to output, to the image processing apparatus 10, a captured frame image. Then, the image processing apparatus can be configured to convert the pixels, i.e., luminance values, of the captured frame image into digital pixels, i.e., digital luminance values, in accordance with a predetermined bit width, i.e., the number of bits, thus obtaining a digital frame image comprised of the digital pixels, i.e., digital luminance values.

A substantially plate-like hood 60 is, as illustrated in FIG. 2, arranged below the vehicular camera 20 for reducing the entrance of light into the vehicular camera 20 from, for example, below, i.e., from the inside of the vehicle V. The hood 60 serves as, for example, a cover member for covering the vehicular camera 20, and can be made of black antireflective material or plastic. That is, such a cover member can have any shape and be arranged at any position in the vehicle V as long as the cover member has a function of covering the vehicular camera 20.

The hood 60 may have a reflectance, and setting the reflectance of the hood to completely zero is difficult. Light, i.e., sunlight, from the sun 70 may be reflected by the hood 60, so that, in addition to incoming light L1 from a target object located in the field of view, light L2 reflected by the hood 60 may enter the light receiving surface of the image sensor 22 of the vehicular camera 20.

The image display recorder 30 is located at a position in the compartment of the vehicle V; the position can be arranged within a viewable range of a driver of the vehicle V, such as a position located adjacently to the windshield 50 of the vehicle V. The image display recorder 30 can be configured to display and/or record various information items, such as corrected images, outputted from the image processing apparatus 10. The image display recorder 30 can be communicable with a display of a vehicle navigation system installed in the V, and the image display recorder 30 can be configured to display various information items on the display of the vehicle navigation system.

The cruise assist apparatus 40 is comprised of, for example, at least one microcomputer essentially including a central processing unit (CPU) and a storage unit including one or more non-transitory processor-readable media, such as a read-only memory (ROM), a random-access memory (RAM), and/or a flash memory.

The cruise assist apparatus 40 is configured to receive the corrected images outputted from the image processing apparatus 10, and perform, based on the corrected images, a cruise assist task including, for example, 1. A first control task of controlling braking of the vehicle V 2. A second control task of controlling the steering of the vehicle V 3. A third task of controlling lane keeping of the vehicle V, which keeps the vehicle V within a target lane of a road on which the vehicle V is traveling 4. A fourth task of controlling outputting of warnings if it is determined that the vehicle V is about to depart from the target lane The image processing apparatus 10 is comprised of at least one microcomputer essentially including a CPU 11 and a storage unit 12 including one or more non-transitory processor-readable media, such as a ROM, a RAM, and/or a flash memory.

The storage unit 12 stores one or more programs, i.e., program instructions of one or more programs.

The CPU 11 functionally includes, for example, an image obtainer 101, a histogram generator 102, an image corrector 103, an exposure time adjuster 104, and an output unit 105.

Figure 3:
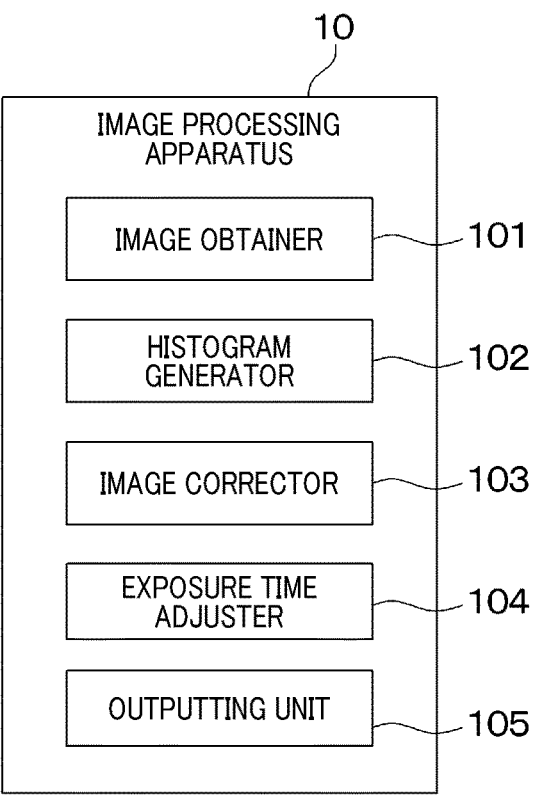
FIG. 3 is a block diagram schematically illustrating an example of the functional structure of the image processing apparatus illustrated in FIG. 1.

For example, the above components 101 to 105 respectively show functions included in the image processing apparatus 10, and therefore these components 101 to 105 are illustrated as individual blocks 101 to 105 in FIG. 3. At least part of all functions, which include the functions 101 to 105, provided by the image processing apparatus 10 can be implemented by at least one processor, such as the CPU 11; the at least one processor can be comprised of (1) The combination of at least one programmable processing unit, i.e., at least one programmable logic circuit, and at least one memory (2) At least one hardwired logic circuit (3) At least one hardwired-logic and programmable-logic hybrid circuit The CPU 11 is configured to run the one or more programs, i.e., instructions of the one or more programs, stored in the storage unit 12, thus implementing various functions corresponding to the one or more programs.

The image obtainer 101 is configured to cyclically obtain a frame image comprised of digital pixels, i.e., digital luminance values, each time the frame image is cyclically outputted from the vehicular camera 20.

The frame image is, as described above, one of

I. A color digital frame image comprised of RGB pixels, each of which is comprised of a red luminance value, a green luminance value, and a blue luminance value 2. A color digital frame image comprised of pixels, each of which is comprised of only a red luminance value, a green luminance value, or a blue luminance value 3. A gray-scale frame image A frame image obtained by a current capturing cycle of the image obtainer 101 will also be referred to as a current-cycle frame image, so that a frame image obtained by a next capturing cycle of the image obtainer 101 will also be referred to as a next-cycle frame image.

The histogram generator 102 is configured to generate, based on the frame image, at least one histogram H1 in, for example, a storage space of the storage unit 12; the at least one histogram H1 graphically shows the number of pixels for each luminance value included in the frame image. The at least one histogram H1 can be shown as a graphical representation of a frequency distribution in which a horizontal axis of the graph lists each luminance value included in the frame image, and a vertical axis of the graph represents the number of pixels for each luminance value included in the frame image. The luminance values listed in the horizontal axis of the at least one histogram H1 is within the range from a least, i.e., lowest, luminance value (LB) to a most, i.e., highest, luminance value (MB) inclusive.

For example, if the frame image is a color digital image comprised of RGB pixels, each of which is comprised of a red luminance value, a green luminance value, and a blue luminance value, the histogram generator 102 can be configured to generate, as the at least one histogram H1, a red-luminance histogram, a green-luminance histogram, and a blue-luminance histogram.

The red-luminance histogram shows the number of pixels for each red luminance value included in the frame image.

The green-luminance histogram shows the number of pixels for each green luminance value included in the frame image.

The blue-luminance histogram shows the number of pixels for each blue luminance value included in the frame image.

The image corrector 103 is configured to perform a correction task of correcting the frame image obtained by the image obtainer 102 based on the at least one histogram H1 of the frame image to accordingly generate a corrected frame image that has no or less white blurs, flared highlights, and/or blocked-up shadows therein.

The following describes how the image corrector 103 performs the correction task.

Figure 4:
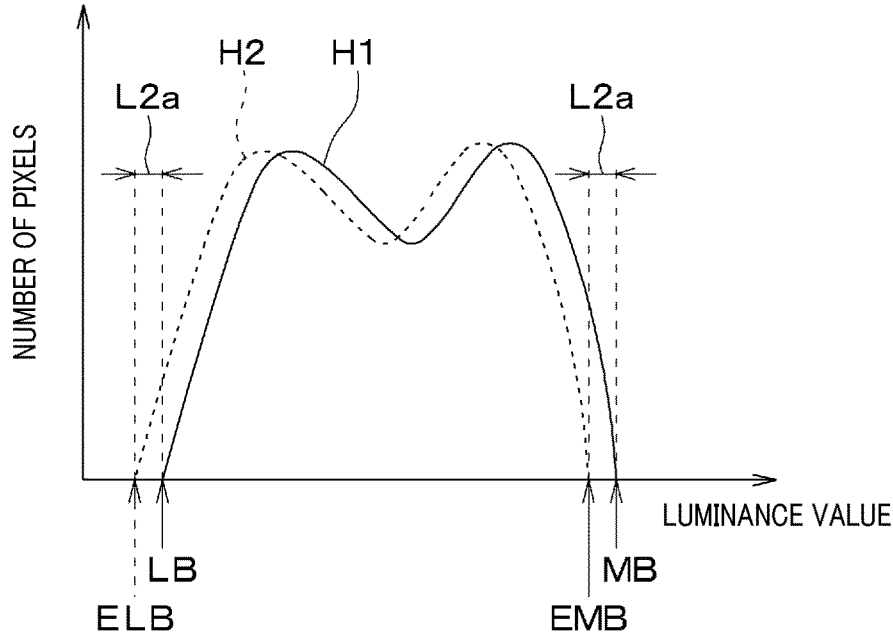
FIG. 4 is a graph schematically illustrating an example of a histogram, and a corrected histogram having an estimated most luminance value and an estimated least luminance value.

Let us assume that the following histogram H1 illustrated in FIG. 4 is generated by the histogram generator 102 based on a frame image obtained by the image obtainer 101.

The frame image includes a first image component based on both (i) incoming light L1 from a target object located in the field of view and (ii) light L2 reflected by the hood 60. For this reason, the histogram H1 is generated based on the frame image with the influence of the light L2 reflected from the hood 60.

Specifically, the generated histogram H1 may include white blurs and/or flared highlights due to the light L2 reflected from the hood 60. In other words, the generated histogram H1 may entirely include luminance values due to the light L2 reflected from the hood 60.

From this viewpoint, the image corrector 103 performs, as an example of the correction task, a task of estimating and selecting, from the generated histogram H1, luminance values that are estimated to be due to the influence of the light L2 reflected from the hood 60.

Specifically, the image corrector 103 estimates that the generated histogram H1 includes a direct influence of the light L2 reflected from the hood 60, which will also be referred to as reflected light L2, so that the generated histogram H1 includes white blurs and/or flared highlights due to the light L2 reflected from the hood 60. For this reason, the image corrector 103 uses, for example, the most luminance value MB as a luminance correction to calculate, based on the luminance correction, i.e., the most luminance value MB, a luminance increment L2a caused by the influence of the reflected light L2, and eliminates the luminance increment L2a caused by the influence of the reflected light L2 from the most luminance value MB to accordingly determine an estimated most luminance value EMB.

For example, the image corrector 103 calculates the luminance increment L2a caused by the influence of the reflected light L2 in accordance with the following relational expression [eq 1]:

$$L2a = MB \times CC \qquad \text{[eq 1]}$$

where CC represents a correction coefficient.

Then, the image corrector 103 calculates the estimated most luminance value EMB in accordance with the following relational expression [eq 2]:

$$EMB = MB - L2a \qquad \text{[eq 2]}$$

The correction coefficient CC can be previously determined by, for example, experiments and/or computer simulations carried out in consideration of (I) the properties of the material of the windshield 50, (II) the inclined angle of the windshield 50 with respect to, for example, the height direction of the vehicle V, (III) the reflectance of the hood 50, and (IV) the inclined angle of the hood 50 with respect to, for example, the horizontal direction perpendicular to the longitudinal direction and the height direction of the vehicle V. The correction coefficient CC can be stored in, for example, the storage unit 12.

Subsequently, the image corrector 103 determines, based on the least luminance value LB and the luminance increment L2a caused by the influence of the reflected light L2, an estimated least luminance value ELB.

Specifically, the image corrector 103 estimates that the generated histogram H1 includes an influence of the light L2 reflected from the hood 60. For this reason, the image corrector 103 subtracts the luminance increment L2a caused by the influence of the reflected light L2 from the least luminance value LB to accordingly calculate the estimated least luminance value ELB in accordance with the following relational expression [eq 3]:

$$ELB = LB - L2a \qquad \text{[eq 3]}$$

After determination of the estimated most and least luminance values EMB and ELB, the image corrector 103 translates the generated histogram H1 toward the negative side of the horizontal direction to accordingly generate, in, for example, the storage space of the storage unit 12, a corrected histogram H2 whose most luminance value MB is the estimated most luminance value MEB, and whose least luminance value LB is the estimated least luminance value LEB. That is, the image corrector 103 can subtract, from the generated histogram H1, (i) luminance values and their number of pixels within the influenced luminance increment L2a from the most luminance value MB and (ii) luminance values and their number of pixels within the influenced luminance increment L2a from the least luminance value LB, thus generating the corrected histogram H2.

After generation of the corrected histogram H2, the image corrector 103 generates, based on the corrected histogram H2, a corrected frame image. For example, the image corrector 103 can perform, based on the corrected histogram H2, a tone-curve adjustment task of adjusting a predetermined tone curve between input and output luminance values of the frame image, thus generating a corrected frame image based on the frame image and the adjusted tone curve.

Specifically, the image corrector 103 is configured to
(1) Subtract, from the generated histogram H1, (1) luminance values and their number of pixels within the influenced luminance increment L2a from the most luminance value MB and (2) luminance values and their number of pixels within the influenced luminance increment L2a from the least luminance value LB to accordingly generate the corrected histogram H2

(2) Generate a corrected frame image based on the corrected histogram H2

This configuration therefore prevents the occurrence of white blurs and/or flared highlights in the corrected frame image, while reducing the likelihood of blocked-up shadows in the corrected frame image even if the light L2 reflected from the hood 60 suddenly disappears.

Note that a situation where the light L2 reflected from the hood 60 suddenly disappears is, for example, a situation where the vehicle V is entering a tunnel.

For example, the predetermined tone curve for a frame image according to the exemplary embodiment represents a function between input and output luminance values for each pixel of the frame image. That is, the tone-curve adjustment task for a frame image can multiply the function between input and output luminance values for each pixel of the frame image by a corresponding one of conversion coefficients in accordance with the corrected histogram H2 to accordingly make higher the output luminance value of each pixel included in a higher luminance-value region of the frame image than the output luminance value of each pixel included in a lower luminance-value region of the frame image.

The exposure time adjuster 104 is configured to generate, based on the corrected histogram H2 determined for the frame image, i.e., the current-cycle frame image, a control signal for adjusting the exposure time for a next-cycle frame image in a next capturing cycle of the vehicular camera 20. For example, the control signal instructs the controller 24 to control the exposure time of the image sensor 22 in the next capturing cycle, so that the controlled exposure time enables the most luminance value MX and the least luminance value LB of a next histogram, which will be generated based on a frame image captured in the next capturing cycle, to be smaller as compared with the histogram H1 generated based on the frame image captured in the current capturing cycle.

The output unit 105 is configured to output, to the image display recorder 30 and the cruise assist apparatus 40, the corrected frame image. The image display recorder 30 is configured to display and/or record the corrected frame image. The cruise assist apparatus 40 is configured to receive the corrected frame image, and perform, based on the received corrected frame image, the cruise assist task set forth above.

The output unit 105 is additionally configured to output the control signal to the controller 24 of the vehicular camera 20. This results in the image sensor 22 of the vehicular camera 20 capturing an image in the next capturing cycle during the exposure time controlled, based on the control signal, by the controller 24. Specifically, the controlled exposure time enables the histogram of the frame image captured by the vehicular camera 20 in the next capturing cycle to be translated by the influenced luminance increment L2a toward the negative side of the horizontal axis.

Figure 5:
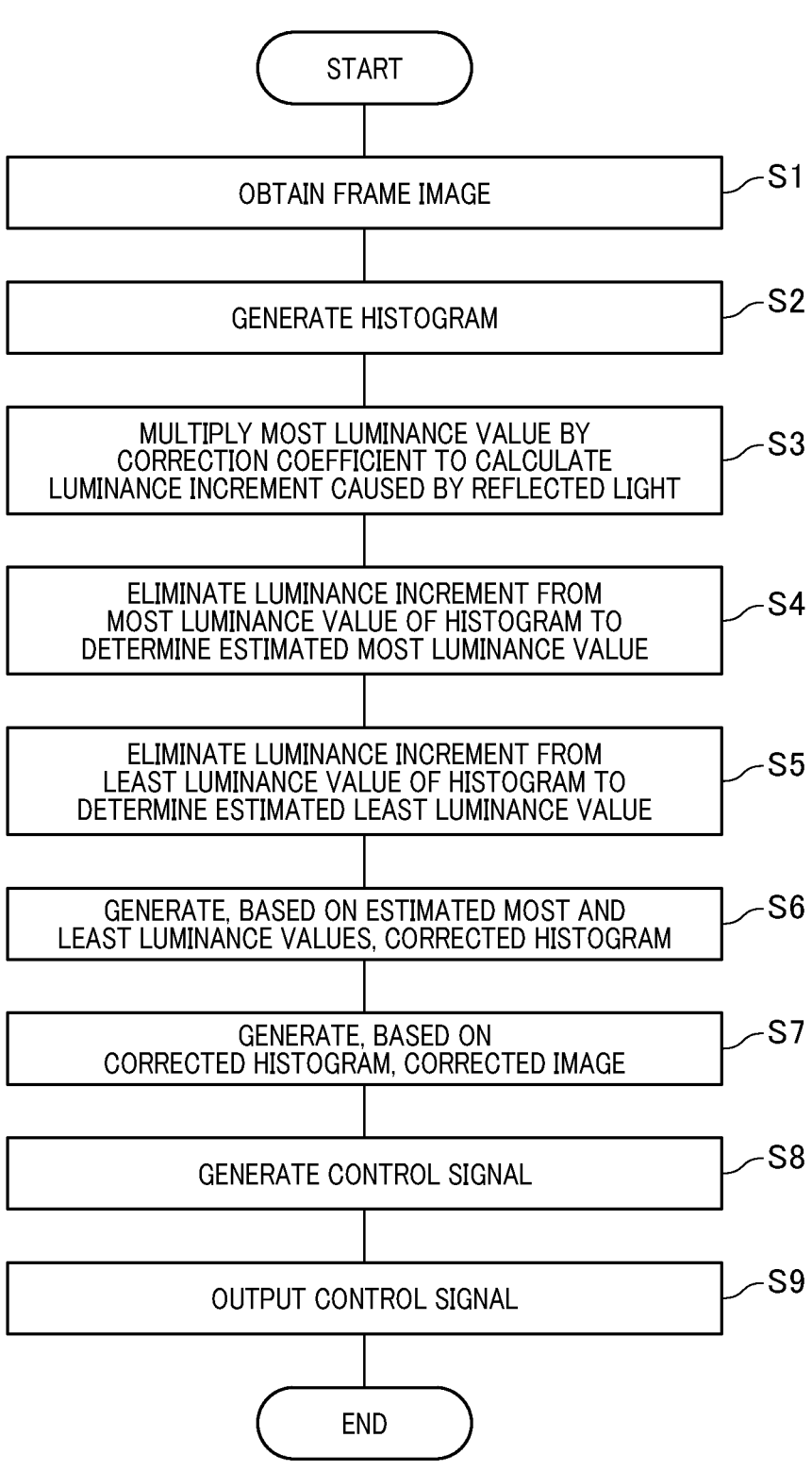
FIG. 5 is a flowchart schematically illustrating an example of a predetermined image-processing algorithm carried out by the image processing apparatus illustrated in FIG. 1.

Next, the following describes a predetermined image-processing algorithm based on the program instructions of the one or more programs stored in the storage unit 12; the algorithm is carried out by the image processing apparatus 10, i.e., the CPU 11 thereof, with reference to FIG. 5. For example, the image processing apparatus 10, i.e., the CPU 11 thereof, is programmed to start the image-processing algorithm each time a frame image is captured by and outputted from the vehicular camera 20 every capturing cycle.

When a frame image captured by the vehicular camera 20 is outputted to the image processing apparatus 10 in a current capturing cycle, the CPU 11 of the image processing apparatus 10 serves as, for example, the image obtainer 101 to obtain the frame image outputted from the vehicular camera 20 in step S1.

Next, the CPU 11 serves as, for example, the histogram generator 102 to generate, based on the frame image obtained in step S1, at least one histogram H1 that shows the number of pixels for each luminance value included in the frame image in step S2. For example, if the frame image is a color digital image comprised of RGB pixels, each of which is comprised of a red luminance value, a green luminance value, and a blue luminance value, the CPU 11 serves as the histogram generator 102 to generate, as the at least one histogram H1, a red-luminance histogram, a green-luminance histogram, and a blue-luminance histogram as described above. The red-luminance histogram shows the number of pixels for each red luminance value included in the frame image. The green-luminance histogram shows the number of pixels for each green luminance value included in the frame image. The blue-luminance histogram shows the number of pixels for each blue luminance value included in the frame image.

Following the operation in step S2, the CPU 11 serves as, for example, the image corrector 103 to calculate, based on the histogram H1, a luminance increment L2a caused by the influence of the reflected light L2 in step S3. For example, as described above, the CPU 11 serves as the image corrector 103 to multiply the most luminance value MB by the correction coefficient CC to accordingly calculate the luminance increment L2a caused by the influence of the reflected light L2 in step S3.

Next, the CPU 11 serves as, for example, the image corrector 103 to determine, based on the histogram H1 and the luminance increment L2a caused by the influence of the reflected light L2, an estimated most luminance value EMB in step S4. For example, the CPU 11 eliminates the luminance increment L2a caused by the influence of the reflected light L2 from the most luminance value MB to accordingly determine the estimated most luminance value EMB in step S4.

Subsequently, the CPU 11 serves as, for example, the image corrector 103 to determine, based on the histogram H1 and the luminance increment L2a caused by the influence of the reflected light L2, an estimated least luminance value ELB in step S5. For example, the CPU 11 eliminates the luminance increment L2a caused by the influence of the reflected light L2 from the least luminance value LB to accordingly determine the estimated least luminance value ELB in step S5.

Next, the CPU 11 serves as, for example, the image corrector 103 to translate the histogram H1 toward the negative side of the horizontal direction to accordingly generate a corrected histogram H2 whose most luminance value MB is the estimated most luminance value MEB, and whose least luminance value LB is the estimated least luminance value LEB in step S6.

Following the operation in step S6, the CPU 11 serves as, for example, the image corrector 103 to generate, based on the corrected histogram H2, a corrected frame image. For example, the CPU 11 serves as the image corrector 103 to perform, based on the corrected histogram H2, the tone-curve adjustment task of adjusting the predetermined tone curve between the input and output luminance values of the frame image, thus generating a corrected frame image based on the frame image and the adjusted tone curve.

Following or subsequently to the operation in step S7, the CPU 11 serves as, for example, the exposure time adjuster 104 to generate, based on the corrected histogram H2 determined for the frame image, i.e., the current-cycle frame image, a control signal for adjusting the exposure time for a next-cycle frame image in a next capturing cycle of the vehicular camera 20 in step S8.

Then, the CPU 11 serves as, for example, the output unit 105 to (I) Output, to the image display recorder 30 and the cruise assist apparatus 40, the corrected frame image (II) Output, to the controller 24 of the vehicular camera 20, the control signal This results in the image sensor 22 of the vehicular camera 20 capturing an image in the next capturing cycle during the exposure time controlled, based on the control signal, by the controller 24.

After the operation in step S9, the CPU 11 terminates the image-processing algorithm, and is ready to obtain a next frame image captured by the vehicular camera 20 in the next capturing cycle.

As described above, the image processing apparatus 10 according to the exemplary embodiment is configured to (I) Eliminate the luminance increment L2a caused by the influence of the reflected light L2 from the most luminance value MB of the histogram H1 generated from a frame image captured by the vehicular camera 20 to accordingly determine the estimated most luminance value EMB (II) Eliminate the luminance increment L2a caused by the influence of the reflected light L2 from the least luminance value LB of the histogram H1 to accordingly determine the estimated least luminance value ELB The image processing apparatus 10 according to the exemplary embodiment is additionally configured to generate the corrected histogram H2 based on the estimated most luminance value EMB and the estimated least luminance value ELB, and generate the corrected frame image based on the generated corrected histogram H2.

This configuration of the image processing apparatus 10 therefore reduces, from the corrected frame image, the influence of the light L2 reflected from the hood 60, making it possible to prevent the occurrence of white blurs and/or flared highlights in the corrected frame image, while reducing the likelihood of blocked-up shadows in the corrected frame image even if the light L2 reflected from the hood 60 suddenly disappears.

Additionally, the above configuration of the image processing apparatus 10 factors in the reflectance of the hood 60 to accordingly generate the corrected frame image. This therefore enables any material to be selected for the material of the hood 60, making it possible to improve the material flexibility of the hood 60.

The above configuration of the image processing apparatus 10 multiplies the most luminance value MB by the correction coefficient CC to thereby calculate the luminance increment L2a caused by the influence of the reflected light L2. This therefore makes it easy to calculate the luminance increment L2a caused by the influence of the reflected light L2 in consideration of the influence of the reflected light L2.

Modifications

While the illustrative exemplary embodiment of the present disclosure has been described herein, the present disclosure is not limited to the exemplary embodiment and its configuration described herein. Specifically, the present disclosure includes various modifications and/or alternatives within the scope of the present disclosure. In addition to various combinations and forms, other combinations and forms including one or more/less elements thereof are also within the inventive principle and scope of the present disclosure.

For example, the exemplary embodiment has described the vehicle V as an example of a mobile object, but image processing apparatuses according to the present disclosure can be installed in another mobile object, such as a train.

The above method of calculating the luminance increment L2a caused by the reflected light L2 can be freely changed. For example, the CPU 11 serves as the image corrector 103 to calculate, in step S3a in place of step S3 (see FIG. 6), an average luminance value of all the luminance values included in the histogram H1, and multiply the average luminance value by an additional correction coefficient CCA to accordingly calculate the luminance increment L2a caused by the influence of the reflected light L2 in accordance with the following relational expression [eq 2] in step S3a:

$$L2a = AV \times CCA \qquad \text{[eq 2]}$$

where:

AV represents the average luminance value; and

CCA represents the additional correction coefficient.

The additional correction coefficient CCA can be previously determined by, for example, experiments and/or computer simulations carried out in consideration of (I) the properties of the material of the windshield 50, (II) the inclined angle of the windshield 50 with respect to, for example, the height direction of the vehicle V, (III) the reflectance of the hood 50, and (IV) the inclined angle of the hood 50 with respect to, for example, the horizontal direction perpendicular to the longitudinal direction and the height direction of the vehicle V. The additional correction coefficient CCA can be stored in, for example, the storage unit 12. The average luminance value of all the luminance values included in the histogram H1 serves as, for example, the luminance correction according to this modification.

The image processing apparatuses and image processing methods described in the present disclosure can be implemented by a dedicated computer including a memory and a processor programmed to perform one or more functions embodied by one or more computer programs.

The image processing apparatuses and image processing methods described in the present disclosure can also be implemented by a dedicated computer including a processor comprised of one or more dedicated hardware logic circuits.

The image processing apparatuses and image processing methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An image processing apparatus for an imaging unit that captures, during a controllable exposure time, an image based on incoming light and light reflected from a cover member for covering the imaging unit, the image processing apparatus comprising:
    an image obtainer configured to obtain, from the imaging unit, the image captured by the imaging unit, the image being comprised of pixels, each of which has a corresponding one of luminance values;
    a histogram generator configured to generate a histogram based on the luminance values of the respective pixels of the image, the histogram representing a relationship between each of the luminance values of the image listed in a predetermined axis and the number of pixels for the corresponding one of the luminance values, the luminance values included in the histogram being within a range from a least luminance value to a most luminance value inclusive; and
    an image corrector configured to:
        calculate, based on the histogram, a luminance increment caused by the light reflected from the cover member;
        translate, based on the luminance increment, the histogram in a negative side of the predetermined axis of the histogram to accordingly generate a corrected histogram, the corrected histogram having (i) an estimated least luminance value that is lower than the least luminance value, and (ii) an estimated most luminance value that is lower than the most luminance value; and
        generate, based on the corrected histogram and the image, a corrected image.

2. The image processing apparatus according to claim 1, further comprising:
    an exposure time adjuster configured to generate, based on the corrected histogram, a control signal for adjusting the exposure time; and
    an output unit configured to output the corrected image and the control signal.

3. The image processing apparatus according to claim 1, wherein:
    the image corrector is configured to:
        subtract, from the least luminance value, the luminance increment to accordingly calculate the estimated least luminance value; and subtract, from the most luminance value, the luminance increment to accordingly calculate the estimated most luminance value.

4. The image processing apparatus according to claim 1, wherein:
    the image corrector is configured to multiply the most luminance value by a predetermined correction coefficient to accordingly calculate the luminance increment.

5. The image processing apparatus according to claim 1, wherein:
    the image corrector is configured to:
        calculate an average luminance value of all the luminance values included in the histogram; and
        multiply the average luminance value by a predetermined correction coefficient to accordingly calculate the luminance increment.

6. A program product for at least one processor for an imaging unit that captures, during a controllable exposure time, an image based on incoming light and light reflected from a cover member for covering the imaging unit, the program product comprising:
    a non-transitory processor-readable medium; and
    a set of program instructions embedded in the processor-readable medium, the instructions causing the at least one processor to:
        obtain, from the imaging unit, the image captured by the imaging unit, the image being comprised of pixels, each of which has a corresponding one of luminance values;
        generate a histogram based on the luminance values of the respective pixels of the image, the histogram representing a relationship between each of the luminance values of the image listed in a predetermined axis and the number of pixels for the corresponding one of the luminance values, the luminance values included in the histogram being within a range from a least luminance value to a most luminance value inclusive;
        calculate, based on the histogram, a luminance increment caused by the light reflected from the cover member;
        translate, based on the luminance increment, the histogram in a negative side of the predetermined axis of the histogram to accordingly generate a corrected histogram, the corrected histogram having (i) an estimated least luminance value that is lower than the least luminance value, and (ii) an estimated most luminance value that is lower than the most luminance value; and
        generate, based on the corrected histogram and the image, a corrected image.

* * * * *